United States Patent
Thomas et al.

(10) Patent No.: US 9,512,901 B2
(45) Date of Patent: Dec. 6, 2016

(54) MULTI-SPEED TRANSMISSION

(71) Applicant: Ford Global Technologies, LLC, Dearborn, MI (US)

(72) Inventors: Steven Gerald Thomas, Bloomfield Hills, MI (US); Reid Alan Baldwin, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/800,976

(22) Filed: Jul. 16, 2015

(65) Prior Publication Data

US 2015/0316128 A1 Nov. 5, 2015

Related U.S. Application Data

(62) Division of application No. 13/760,203, filed on Feb. 6, 2013, now Pat. No. 9,109,668.

(51) Int. Cl.
*F16H 3/44* (2006.01)
*F16H 3/62* (2006.01)
*F16H 3/66* (2006.01)

(52) U.S. Cl.
CPC ........ *F16H 3/62* (2013.01); *F16H 3/66* (2013.01); *F16H 2003/442* (2013.01); *F16H 2003/445* (2013.01); *F16H 2200/0065* (2013.01); *F16H 2200/2012* (2013.01); *F16H 2200/2046* (2013.01)

(58) Field of Classification Search
None
See application file for complete search history.

(56) References Cited

U.S. PATENT DOCUMENTS

| | | | |
|---|---|---|---|
| 4,683,776 A * | 8/1987 | Klemen | F16H 3/66 475/286 |
| 6,955,627 B2 | 10/2005 | Thomas et al. | |
| 6,960,149 B2 | 11/2005 | Ziemer | |
| 7,163,484 B2 | 1/2007 | Klemen | |
| 7,226,381 B2 * | 6/2007 | Klemen | F16H 3/66 475/275 |
| 8,137,232 B2 | 3/2012 | Wittkopp et al. | |
| 8,177,674 B2 * | 5/2012 | Baldwin | F16H 3/66 475/275 |
| 8,197,376 B2 * | 6/2012 | Gumpoltsberger | F16H 3/66 475/269 |
| 8,210,982 B2 | 7/2012 | Gumpoltsberger et al. | |
| 8,210,983 B2 | 7/2012 | Gumpoltsberger et al. | |
| 8,231,495 B2 | 7/2012 | Gumpoltsberger et al. | |

(Continued)

OTHER PUBLICATIONS

H. Benford, M. Leising, The Lever Analogy: A New Tool in Transmission Analysis, 1982, Society of Automotive Engineers, Inc. 810102, p. 429-437.

*Primary Examiner* — Dirk Wright
(74) *Attorney, Agent, or Firm* — James Dottavio; Brooks Kushman P.C.

(57) ABSTRACT

A family of transmission gearing arrangements produces up to nine forward and one reverse speed ratios by selective engagement of three shift elements in various combinations. Each disclosed transmission includes four planetary gear sets and six elements. Two of the arrangements feature planetary gear sets that are separated radially and are particularly suited to applications that require reduced axial length.

10 Claims, 5 Drawing Sheets

(56) References Cited

U.S. PATENT DOCUMENTS

| | | | |
|---|---|---|---|
| 8,231,496 B2 | 7/2012 | Gumpoltsberger et al. | |
| 8,231,501 B2 | 7/2012 | Gumpoltsberger et al. | |
| 8,246,504 B2 | 8/2012 | Gumpoltsberger et al. | |
| 8,251,859 B2 | 8/2012 | Gumpoltsberger et al. | |
| 8,303,455 B2* | 11/2012 | Gumpoltsberger | F16H 3/66 475/280 |
| 8,353,801 B2 | 1/2013 | Hart et al. | |
| 8,403,803 B2* | 3/2013 | Gumpoltsberger | F16H 3/66 475/276 |
| 8,409,047 B2* | 4/2013 | Borgerson | F16H 3/666 475/284 |
| 8,444,524 B2* | 5/2013 | Gumpoltsberger | F16H 3/66 475/276 |
| 8,597,152 B2 | 12/2013 | Seo et al. | |
| 9,068,630 B2* | 6/2015 | Thomas | F16H 3/66 |
| 9,423,005 B2* | 8/2016 | Goleski | F16H 3/62 |
| 9,435,404 B2* | 9/2016 | Goleski | F16H 3/66 |
| 2011/0009229 A1 | 1/2011 | Bauknecht et al. | |
| 2011/0183807 A1 | 7/2011 | Gumpoltsberger et al. | |
| 2011/0245016 A1 | 10/2011 | Wittkopp et al. | |
| 2012/0065019 A1 | 3/2012 | Hart et al. | |
| 2012/0065020 A1 | 3/2012 | Mellet et al. | |

* cited by examiner

MULTI-SPEED TRANSMISSION

CROSS-REFERENCE TO RELATED APPLICATIONS

This application is a division of U.S. application Ser. No. 13/760,203 filed Feb. 6, 2013, now U.S. Pat. No. 9,109,668, issued Aug. 18, 2015, the disclosure of which is hereby incorporated in its entirety by reference herein.

TECHNICAL FIELD

This disclosure relates to the field of automatic transmissions for motor vehicles. More particularly, the disclosure pertains to an arrangement of gears, clutches, and the interconnections among them in a power transmission.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

SUMMARY OF THE DISCLOSURE

In a first embodiment, a transmission includes first, second, and third gearing arrangements, a first clutch, and first and second brakes, configured to selectively establish nine forward and one reverse speed ratio between an input shaft and an output shaft. The first gearing arrangement selectively constrains the speed of a second shaft to fall between the speeds of the input shaft and a fourth shaft. The second gearing arrangement fixedly constrains the speed of a third shaft to fall between the speeds of the second shaft and the fourth shaft. The third gearing arrangement selectively constrains the speed of the output shaft to fall between zero and the speed of the third shaft and selectively constrains the speed of the input shaft to fall between the speeds of the third shaft and the output shaft. The first clutch selectively couples the input shaft to the second shaft. The first and second brakes selectively hold the second and fourth shafts, respectively, against rotation.

In a second embodiment, a transmission includes first, second, and third gearing arrangements, a first clutch, and a first brake, configured to selectively establish nine forward and one reverse speed ratio between an input shaft and an output shaft. The first gearing arrangement selectively constrains the speed of a third shaft to fall between zero and the speed of a second shaft and selectively constrains the speed of the second shaft to fall between the speeds of the input shaft and the third shaft. The second gearing arrangement selectively constrains the speed of the output shaft to fall between zero and the speed of the third shaft. The third gearing arrangement selectively constrains the speed of the input shaft to fall between the speeds of the third shaft and the output shaft. The first clutch selectively couples the input shaft to the second shaft. The first brake selectively holds the second shaft against rotation.

In a third embodiment, a transmission includes first, second, and third gearing arrangements, first and second clutches, and a first brake, configured to selectively establish nine forward and one reverse speed ratio between an input shaft and an output shaft. The first gearing arrangement fixedly constrains the speed of a second shaft to fall between the speeds of a first shaft and a third shaft. The second gearing arrangement selectively constrains the speed of the third shaft to fall between zero and the speed of the first shaft. The third gearing arrangement selectively constrains the speed of the output shaft to fall between zero and the speed of the third shaft and selectively constrains the speed of the input shaft to fall between the speeds of the third shaft and the output shaft. The first and second clutches selectively couple the input shaft to the second and first shafts, respectively. The first brake selectively holds the second shaft against rotation.

In a fourth embodiment, a transmission includes first, second, and third gearing arrangements, a first clutch, and first and second brakes, configured to selectively establish nine forward and one reverse speed ratio between an input shaft and an output shaft. The first gearing arrangement selectively constrains the speed of a third shaft to fall between the speeds of the input shaft and a fourth shaft. The second gearing arrangement fixedly constrains the speed of the third shaft to fall between the speeds of a second shaft and the fourth shaft. The third gearing arrangement selectively constrains the speed of the output shaft to fall between zero and the speed of the third shaft and selectively constrains the speed of the input shaft to fall between the speeds of the third shaft and the output shaft. The first clutch selectively couples the input shaft to the second shaft. The first and second brakes selectively hold the second and fourth shafts, respectively, against rotation.

In a fifth embodiment, a transmission includes first, second, and third gearing arrangements, first and second clutches, and a first brake, configured to selectively establish nine forward and one reverse speed ratio between an input shaft and an output shaft. The first gearing arrangement selectively constrains the speed of a second shaft to fall between zero and the speed of a first shaft. The second gearing arrangement fixedly constrains the speed of the second shaft to fall between the speeds of the first shaft and a third shaft. The third gearing arrangement selectively constrains the speed of the output shaft to fall between zero and the speed of the third shaft and selectively constrains the speed of the input shaft to fall between the speeds of the third shaft and the output shaft. The first and second clutches selectively couple the input shaft to the second and first shafts, respectively. The first brake selectively holds the second shaft against rotation.

In a sixth embodiment, a transmission includes first, second, and third gearing arrangements, first and third clutches, and a first brake, configured to selectively establish nine forward and one reverse speed ratio between an input shaft and an output shaft. The first gearing arrangement selectively constrains the speed of a third shaft to fall between zero and the speed of a second shaft and selectively constrains the speed of the second shaft to fall between the speeds of the input shaft and the third shaft. The second gearing arrangement selectively constrains the speed of a fifth shaft to fall between zero and the speed of a third shaft.

The third gearing arrangement fixedly constrains the speed of the fifth shaft to fall between the speeds of the third shaft and the output shaft. The first and third clutches selectively couple the input shaft to the second and fifth shafts, respectively. The first brake selectively holds the second shaft against rotation.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A gearing arrangement is a collection of rotating elements and shift elements configured to impose specified speed relationships among the rotating elements. Some speed relationships, called fixed speed relationships, are imposed regardless of the state of any shift elements. Other speed relationships, called selective speed relationships, are imposed only when particular shift elements are fully engaged. A discrete ratio transmission has a gearing arrangement that selectively imposes a variety of speed ratios between an input shaft and an output shaft.

A group of rotating elements are fixedly coupled to one another if they are constrained to rotate as a unit in all operating conditions. Rotating elements can be fixedly coupled by spline connections, welding, press fitting, machining from a common solid, or other means. Slight variations in rotational displacement between fixedly coupled elements can occur such as displacement due to lash or shaft compliance. One or more rotating elements that are all fixedly coupled to one another may be called a shaft. In contrast, two rotating elements are selectively coupled by a shift element when the shift element constrains them to rotate as a unit whenever it is fully engaged and they are free to rotate at distinct speeds in at least some other operating condition. A shift element that holds a rotating element against rotation by selectively connecting it to the housing is called a brake. A shift element that selectively couples two or more rotating elements to one another is called a clutch. Shift elements may be actively controlled devices such as hydraulically or electrically actuated clutches or brakes or may be passive devices such as one way clutches or brakes.

Figure 1:
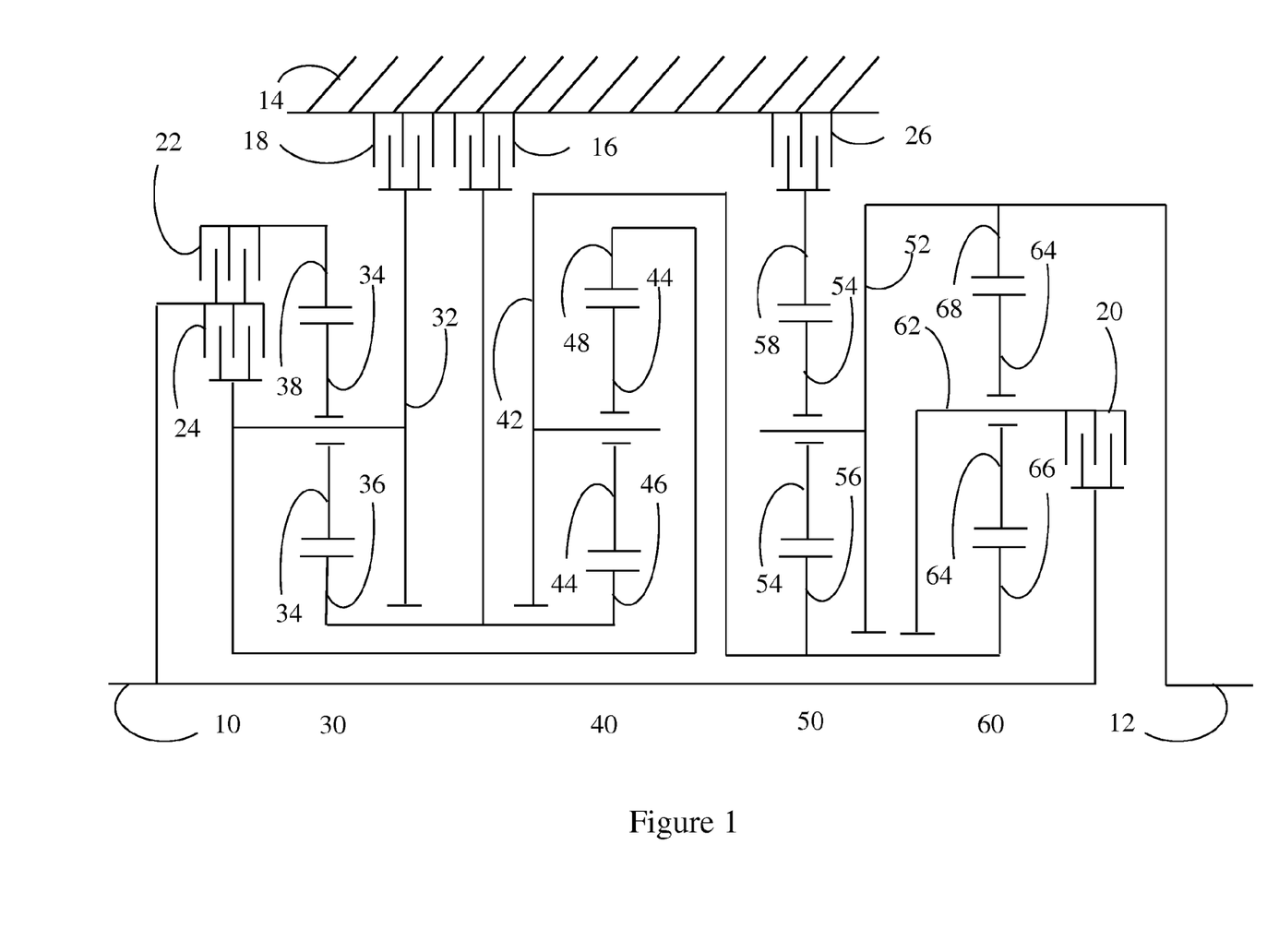
FIG. 1 is a schematic diagram of a first transmission gearing arrangement.

An example transmission is schematically illustrated in FIG. 1. The transmission utilizes four simple planetary gear sets 30, 40, 50, and 60. A planet carrier 32 rotates about a central axis and supports a set of planet gears 34 such that the planet gears rotate with respect to the planet carrier. External gear teeth on the planet gears mesh with external gear teeth on a sun gear 36 and with internal gear teeth on a ring gear 38. The sun gear and ring gear are supported to rotate about the same axis as the carrier. A simple planetary gear set is a type of gearing arrangement that imposes a fixed speed relationship. The speed of the carrier is constrained to be between the speed of the sun gear and the speed of the ring gear. (This relationship is defined to include the condition in which all three rotate at the same speed.) More specifically, the speed of the carrier is a weighted average of the speed of the sun gear and the speed of the ring gear with weighting factors determined by the number of teeth on each gear. Similar fixed speed relationships are imposed by other known types of gearing arrangements. For example, a double pinion planetary gear set fixedly constrains the speed of the ring gear to be a weighted average between the speed of the sun gear and the speed of the carrier. Gear sets 40, 50, and 60 are similarly structured.

A suggested ratio of gear teeth for each planetary gear set is listed in Table 1.

TABLE 1

| | |
|---|---|
| Ring 38/Sun 36 | 1.80 |
| Ring 48/Sun 46 | 1.80 |
| Ring 58/Sun 56 | 1.50 |
| Ring 68/Sun 66 | 2.00 |

In the transmission of FIG. 1, sun gear 36 is fixedly coupled to sun gear 46, carrier 32 is fixedly coupled to ring gear 48, carrier 42 is fixedly coupled to sun gear 56 and sun gear 66, and output shaft 12 is fixedly coupled to carrier 52 and ring gear 68. Carrier 32 is selectively held against rotation by brake 18 and selectively coupled to input shaft 10 by clutch 24. Sun gears 36 and 46 are selectively held against rotation by brake 16. Input shaft 10 is selectively coupled to ring gear 38 by clutch 22 and selectively coupled to carrier 62 by clutch 20. Sun gears 56 and 56 are selectively held against rotation by brake 26. The combination of gear set 30 and clutch 22 selectively impose a speed relationship between carrier 32, sun gear 36, and input shaft 10. Specifically, carrier 32 is constrained to rotate at a speed between the speeds of input shaft 10 and sun gear 36 whenever clutch 22 is engaged. Similarly, the combination of gear set 60 and clutch 20 selectively impose a speed relationship that input shaft 10 is constrained to rotate at a speed between the speeds of output shaft 12 and sun gear 66 whenever clutch 20 is engaged. Also, the combination of gear set 50 and brake 26 selectively impose a speed relationship that output shaft 12 is constrained to rotate at a speed between zero and the speed of sun gear 56 whenever brake 26 is engaged.

As shown in Table 2, engaging the shift elements in combinations of three establishes nine forward speed ratios and one reverse speed ratio between input shaft 10 and output shaft 12. An X indicates that the shift element is required to establish the speed ratio. An (X) indicates the clutch can be applied but is not required. In 4th gear, clutch 20 and brake 26 establish the power flow path between input shaft 10 and output shaft 12. Any one of the remaining shift elements can also be applied. Applying clutch 24 ensures that all single and two step shifts from 4th gear can be accomplished by engaging only one shift element and releasing only one shift element. When the gear sets have tooth numbers as indicated in Table 1, the speed ratios have the values indicated in Table 2.

TABLE 2

|  | 16 | 18 | 20 | 22 | 24 | 26 | Ratio | Step |
|---|---|---|---|---|---|---|---|---|
| Rev |  | X |  | X |  | X | −3.89 | 64% |
| 1st | X |  |  | X |  | X | 6.05 |  |
| 2nd | X |  |  |  | X | X | 3.89 | 1.56 |
| 3rd |  |  |  | X | X | X | 2.50 | 1.56 |
| 4th |  |  | X |  | (X) | X | 1.50 | 1.67 |
| 5th |  |  | X | X | X |  | 1.00 | 1.50 |
| 6th | X |  | X |  | X |  | 0.85 | 1.18 |
| 7th | X |  | X | X |  |  | 0.77 | 1.10 |
| 8th | X | X | X |  |  |  | 0.67 | 1.16 |
| 9th |  | X | X | X |  |  | 0.55 | 1.21 |

Figure 2:
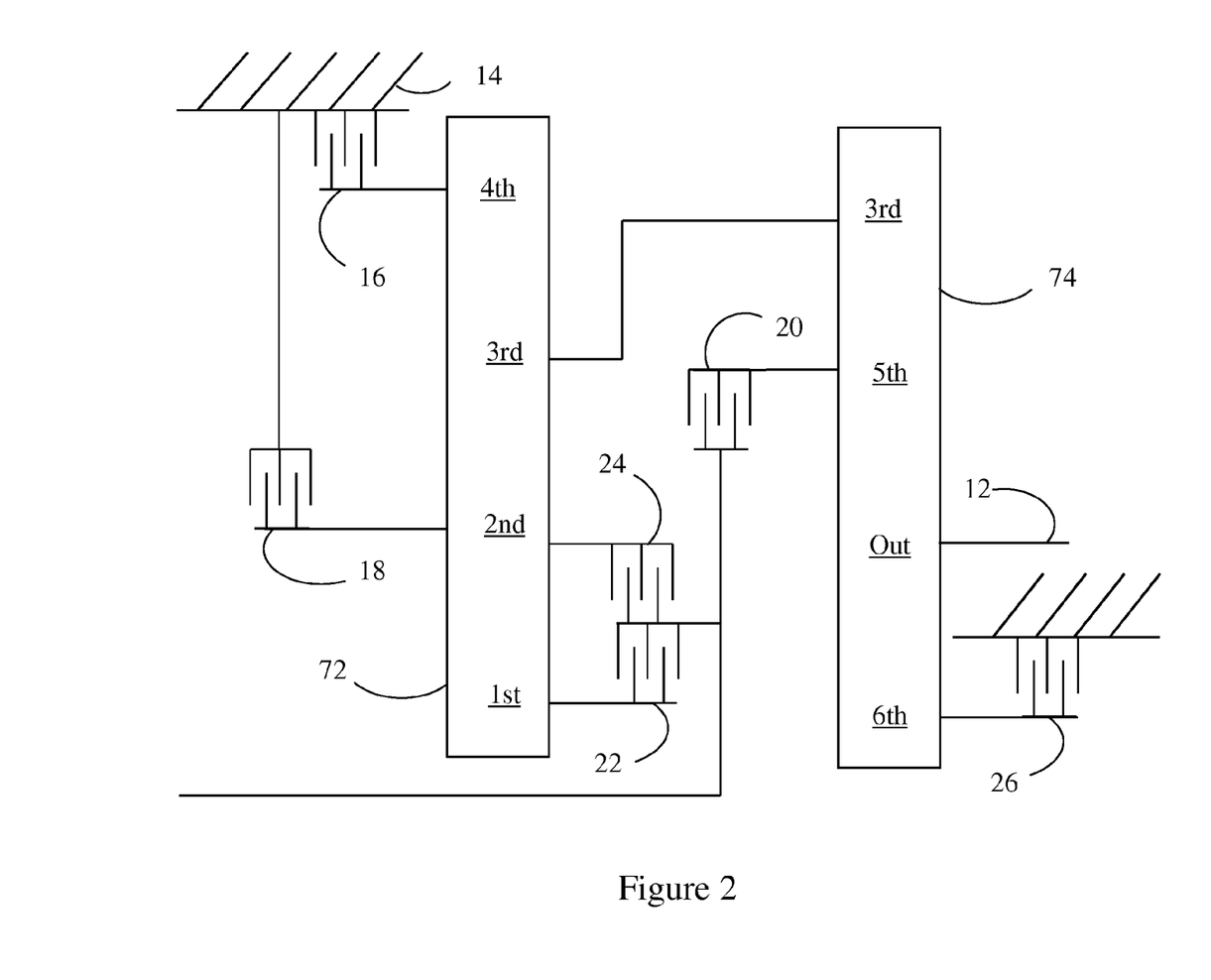
FIG. 2 is a lever diagram corresponding to the first transmission gearing arrangement.

FIG. 2 shows a lever diagram corresponding to the gearing arrangement of FIG. 1. Levers 72 and 74 represent gearing arrangements that fixedly constrain the rotational speeds of four shafts to be linearly related. Ring gear 38 forms the first shaft, the combination of carrier 32 and ring gear 48 forms the second shaft, the combination of carrier 42 and sun gears 56 and 66 forms the third shaft, the combination of sun gears 36 and 46 forms the fourth shaft, carrier 62 forms the fifth shaft, and ring gear 58 forms the sixth shaft. There are many gearing arrangements that can be represented by a four node lever such as levers 72 or 74. Any pair of planetary gear sets wherein two rotating elements of the first gear set are respectively fixedly coupled to two rotating elements of the second gear set will impose the linear speed relationship represented by a four node lever.

Any gearing arrangement that corresponds to the lever diagram of FIG. 2 will impose several selective speed relationships. The combination of lever 72, brake 16, and clutch 22 selectively imposes two speed relationships. The second shaft is constrained to rotate at a speed between the speeds of input shaft 10 and the third shaft whenever clutch 22 is engaged. The third shaft is constrained to rotate at a speed between zero and the speed of the second shaft whenever brake 16 is engaged. The combination of lever 74, brake 26, and clutch 20 selectively imposes two similar speed relationships. The input shaft 10 is constrained to rotate at a speed between the speeds of third shaft and the output shaft whenever clutch 20 is engaged. The output shaft is constrained to rotate at a speed between zero and the speed of the third shaft whenever brake 16 is engaged.

Figure 3:
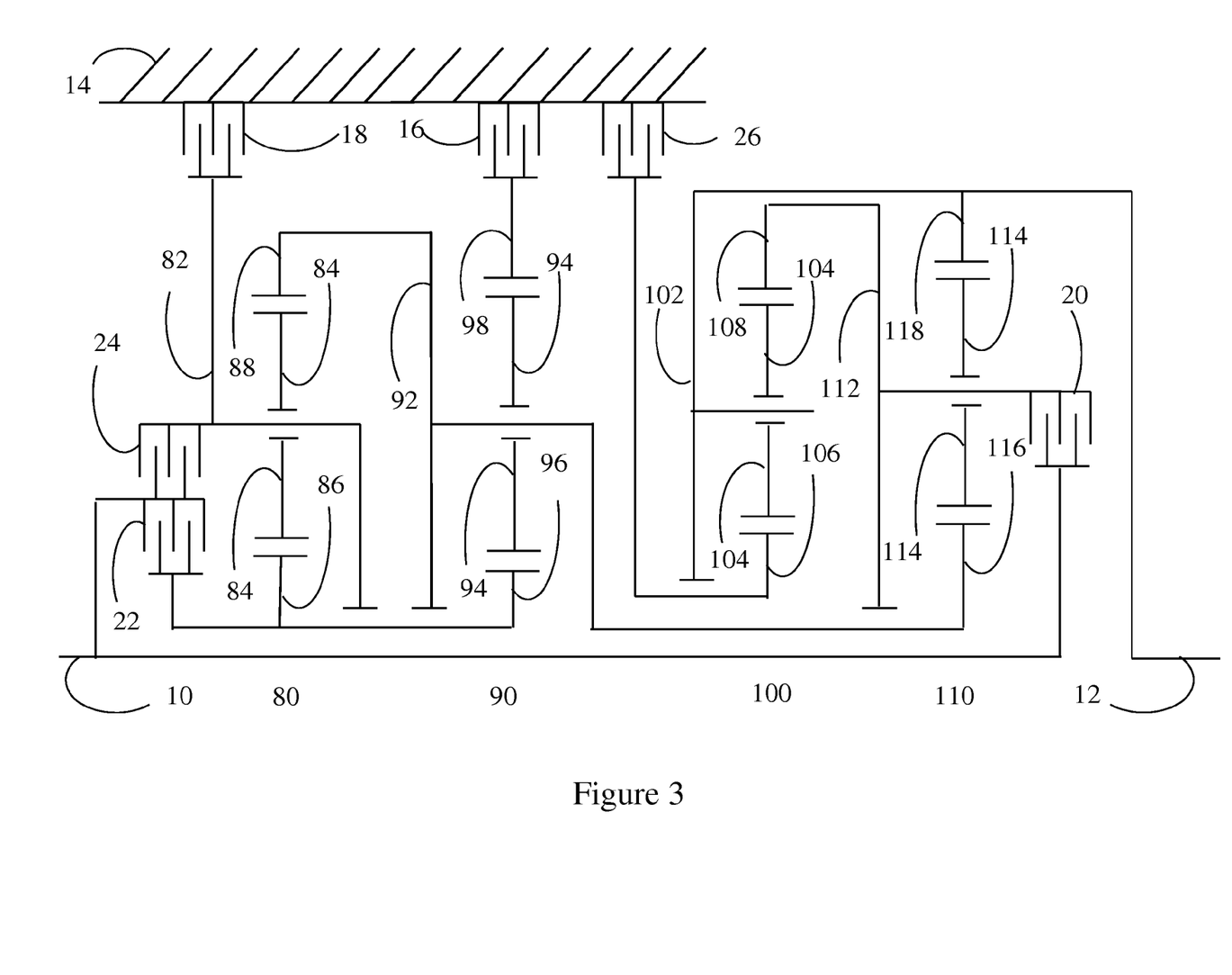
FIG. 3 is a schematic diagram of a second transmission gearing arrangement also corresponding to the lever diagram of FIG. 2.

Another example transmission corresponding to the lever diagram of FIG. 2 is illustrated in FIG. 3. The transmission utilizes four simple planetary gear sets 80, 90, 100, and 110. Suggested numbers of gear teeth for each planetary gear set is listed in Table 3.

TABLE 3

| Ring 88/Sun 86 | 2.00 |
| Ring 98/Sun 96 | 1.90 |

TABLE 3-continued

| Ring 108/Sun 106 | 2.00 |
| Ring 118/Sun 116 | 1.50 |

Sun gear 86 is fixedly coupled to sun gear 96, ring gear 88 and carrier 92 are fixedly coupled to sun gear 116, ring gear 108 is fixedly coupled to carrier 112, and output shaft 12 is fixedly coupled to carrier 102 and ring gear 118. Carrier 82 is selectively held against rotation by brake 18 and selectively coupled to input shaft 10 by clutch 24. Ring gear 98 is selectively held against rotation by brake 16. Input shaft 10 is selectively coupled to sun gears 86 and 96 by clutch 22 and selectively coupled to ring gear 108 and carrier 112 by clutch 20. Sun gear 106 is selectively held against rotation by brake 26. The combination of gear set 90 and brake 16 selectively constrains carrier 92 to rotate at a speed between zero and the speed of sun gear 96 whenever brake 16 is engaged. Similarly, the combination of gear set 100 and brake 26 selectively constrains output shaft 12 to rotate at a speed between zero and the speed of ring gear 108 whenever brake 26 is engaged.

Gear sets 80 and 90 of FIG. 3 correspond to lever 72 of FIG. 2. The combination of sun gears 86 and 96 forms the first shaft, carrier 82 forms the second shaft, the combination of ring gear 88, carrier 92, and sun gears 116 forms the third shaft, and ring gear 98 forms the fourth shaft. Gear sets 100 and 110 of FIG. 3 correspond to lever 74 of FIG. 2. The combination of ring gear 108 and carrier 112 forms the fifth shaft, and sun gear 106 forms the sixth shaft.

As shown in Table 4, engaging the clutches and brakes in combinations of three establishes nine forward speed ratios and one reverse speed ratio between input shaft 10 and output shaft 12. When the gear sets have tooth numbers as indicated in Table 3, the speed ratios have the values indicated in Table 4.

TABLE 4

|  | 16 | 18 | 20 | 22 | 24 | 26 | Ratio | Step |
|---|---|---|---|---|---|---|---|---|
| Rev |  | X |  | X |  | X | −4.50 | 69% |
| 1st | X |  |  | X |  | X | 6.53 |  |
| 2nd | X |  |  |  | X | X | 3.68 | 1.78 |
| 3rd |  |  |  | X | X | X | 2.25 | 1.63 |
| 4th |  |  | X |  | (X) | X | 1.50 | 1.50 |
| 5th |  |  | X | X | X |  | 1.00 | 1.50 |
| 6th | X |  | X |  | X |  | 0.80 | 1.26 |
| 7th | X |  | X | X |  |  | 0.70 | 1.14 |
| 8th | X | X | X |  |  |  | 0.60 | 1.16 |
| 9th |  | X | X | X |  |  | 0.50 | 1.20 |

Figure 4:
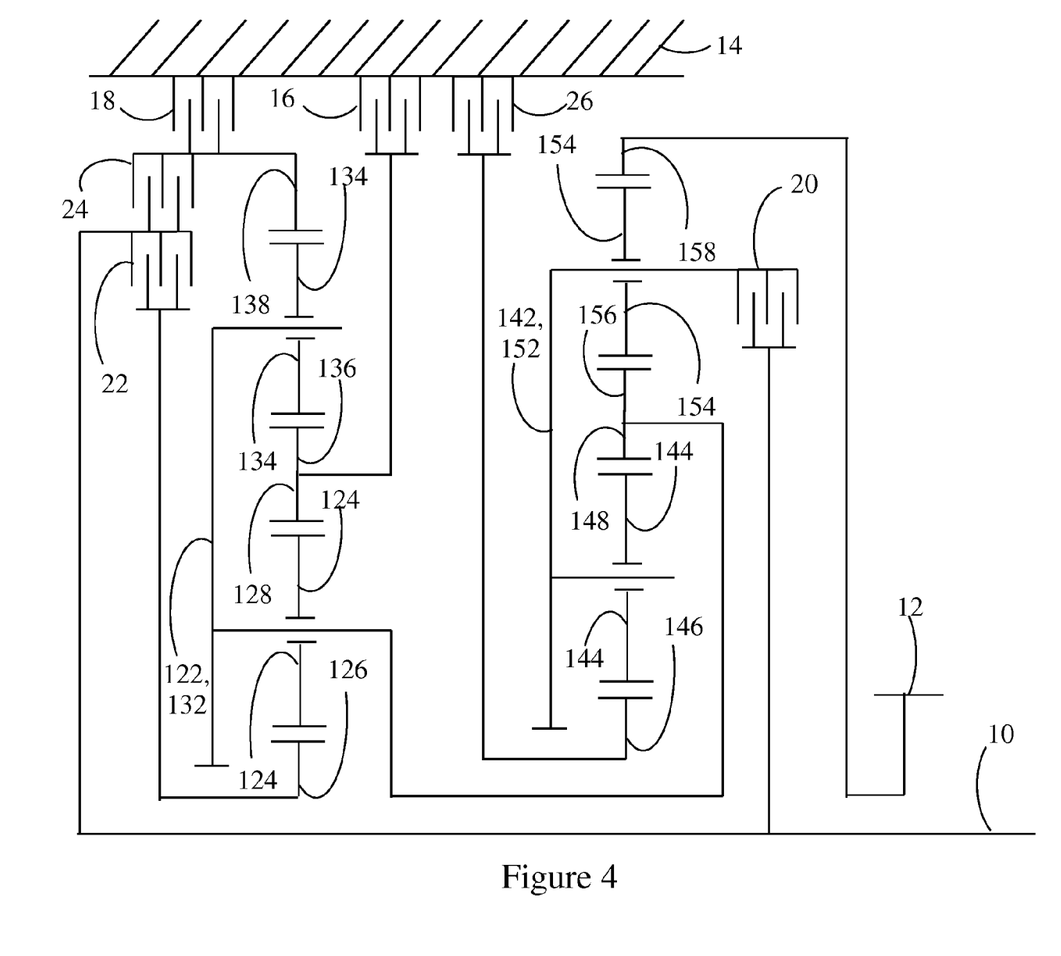
FIG. 4 is a schematic diagram of a third transmission gearing arrangement also corresponding to the lever diagram of FIG. 2.

A third example transmission corresponding to the lever diagram of FIG. 2 is illustrated in FIG. 4. The transmission utilizes four simple planetary gear sets 120, 130, 140, and 150. To reduce the axial length of the transmission, gear set 130 is located radially outside gear set 120 and gear set 150 is located radially outside gear set 140. An output member, which may be either a gear or a sprocket, is fixedly attached to output shaft 12. The output member is engaged with a member on another axis, not shown, to transfer power to vehicle wheels via a differential assembly. Suggested numbers of gear teeth for each planetary gear set is listed in Table 5.

TABLE 5

| | |
|---|---|
| Ring 128/Sun 126 | 1.50 |
| Ring 138/Sun 136 | 1.80 |
| Ring 148/Sun 146 | 1.80 |
| Ring 158/Sun 156 | 1.80 |

Ring gear 128 is fixedly coupled to sun gear 136, carrier 122 and carrier 132 are fixedly coupled to ring gear 148 and sun gear 156, carrier 142 is fixedly coupled to carrier 152, and output shaft 12 is fixedly coupled to ring gear 158. Ring gear 138 is selectively held against rotation by brake 18 and selectively coupled to input shaft 10 by clutch 24. Ring gear 128 and sun gear 136 are selectively held against rotation by brake 16. Input shaft 10 is selectively coupled to sun gear 126 by clutch 22 and selectively coupled to carriers 142 and 152 by clutch 20. Sun gear 146 is selectively held against rotation by brake 26. The combination of gear set 120 and clutch 22 selectively constrains carrier 122 to rotate at a speed between the speeds of ring gear 128 and input shaft 10 whenever clutch 22 is engaged. Similarly, the combination of gear set 140 and brake 26 selectively constrains carrier 142 to rotate at a speed between zero and the speed of ring gear 148 whenever brake 26 is engaged.

Gear sets 120 and 130 of FIG. 4 correspond to lever 72 of FIG. 2. Sun gear 126 forms the first shaft, ring gear 138 forms the second shaft, the combination of carriers 122, carrier 132, ring gear 148, and sun gear 156 forms the third shaft, and the combination of ring gear 128 and sun gear 136 forms the fourth shaft. Gear sets 140 and 150 of FIG. 5 correspond to lever 74 of FIG. 2. The combination of carrier 142 and carrier 152 forms the fifth shaft, and sun gear 146 forms the sixth shaft.

As shown in Table 6, engaging the clutches and brakes in combinations of three establishes nine forward speed ratios and one reverse speed ratio between input shaft 10 and output shaft 12. When the gear sets have tooth numbers as indicated in Table 5, the speed ratios have the values indicated in Table 6.

TABLE 6

| | 16 | 18 | 20 | 22 | 24 | 26 | Ratio | Step |
|---|---|---|---|---|---|---|---|---|
| Rev | | X | | X | | X | −3.83 | 61% |
| 1st | X | | | X | | X | 6.30 | |
| 2nd | X | | | | X | X | 3.75 | 1.68 |
| 3rd | | | | X | X | X | 2.25 | 1.68 |
| 4th | | | X | | (X) | X | 1.45 | 1.56 |
| 5th | | | X | X | X | | 1.00 | 1.45 |
| 6th | X | | X | | X | | 0.82 | 1.22 |
| 7th | X | | X | X | | | 0.74 | 1.11 |
| 8th | X | X | X | | | | 0.64 | 1.15 |
| 9th | | X | X | X | | | 0.53 | 1.21 |

Figure 5:
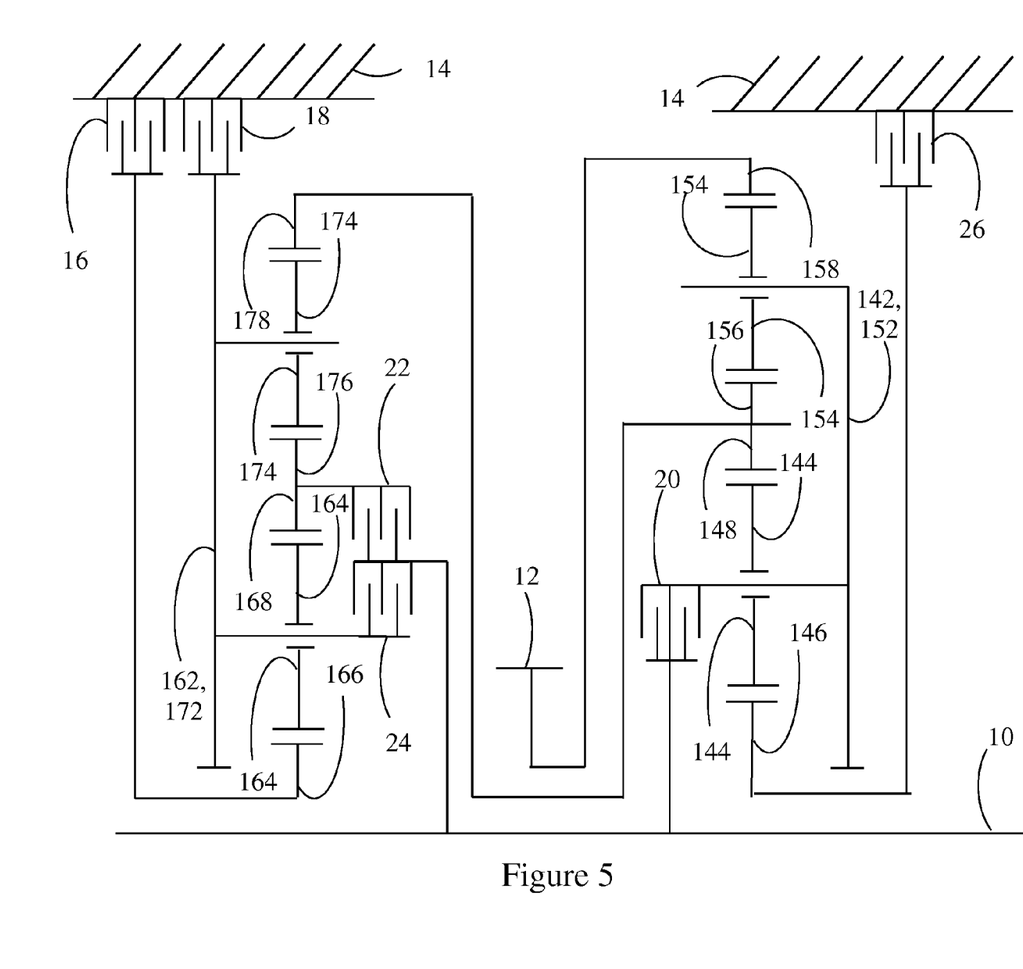
FIG. 5 is a schematic diagram of a fourth transmission gearing arrangement also corresponding to the lever diagram of FIG. 2.

A fourth example transmission corresponding to the lever diagram of FIG. 2 is illustrated in FIG. 5. The transmission utilizes four simple planetary gear sets 160, 170, 140, and 150. To reduce the axial length of the transmission, gear set 170 is located radially outside gear set 160 and gear set 150 is located radially outside gear set 140. An output member, which may be either a gear or a sprocket, is fixedly attached to output shaft 12. The output member is engaged with a member on another axis, not shown, to transfer power to vehicle wheels via a differential assembly. Suggested numbers of gear teeth for each planetary gear set is listed in Table 7.

TABLE 7

| | |
|---|---|
| Ring 128/Sun 126 | 1.50 |
| Ring 138/Sun 136 | 1.80 |
| Ring 148/Sun 146 | 1.80 |
| Ring 158/Sun 156 | 1.80 |

Ring gear 168 is fixedly coupled to sun gear 176, carrier 162 is fixedly coupled to carrier 172, ring gear 178 is fixedly coupled to ring gear 148 and sun gear 156, carrier 142 is fixedly coupled to carrier 152, and output shaft 12 is fixedly coupled to ring gear 158. Carrier 162 and 172 are selectively held against rotation by brake 18 and selectively coupled to input shaft 10 by clutch 24. Sun gear 166 is selectively held against rotation by brake 16. Input shaft 10 is selectively coupled to ring gear 168 and sun gear 176 by clutch 22 and selectively coupled to carriers 142 and 152 by clutch 20. Sun gear 146 is selectively held against rotation by brake 26. The combination of gear set 160 and brake 16 selectively constrains carrier 162 to rotate at a speed between zero and the speed of ring gear 168 whenever brake 16 is engaged. Similarly, the combination of gear set 140 and brake 26 selectively constrains carrier 142 to rotate at a speed between zero and the speed of ring gear 148 whenever brake 26 is engaged.

Gear sets 160 and 170 of FIG. 5 correspond to lever 72 of FIG. 2. The combination of ring gear 168 and sun gear 176 forms the first shaft, the combination of carrier 162 and carrier 172 forms the second shaft, the combination of ring gear 178, ring gear 148, and sun gear 156 forms the third shaft, and sun gear 166 forms the fourth shaft. Gear sets 140 and 150 of FIG. 5 correspond to lever 74 of FIG. 2. The combination of carrier 142 and carrier 152 forms the fifth shaft, and sun gear 146 forms the sixth shaft.

As shown in Table 8, engaging the clutches and brakes in combinations of three establishes nine forward speed ratios and one reverse speed ratio between input shaft 10 and output shaft 12. When the gear sets have tooth numbers as indicated in Table 7, the speed ratios have the values indicated in Table 8.

TABLE 8

| | 16 | 18 | 20 | 22 | 24 | 26 | Ratio | Step |
|---|---|---|---|---|---|---|---|---|
| Rev | | X | | X | | X | −3.38 | 61% |
| 1st | X | | | X | | X | 5.56 | |
| 2nd | X | | | | X | X | 3.57 | 1.56 |
| 3rd | | | | X | X | X | 2.25 | 1.59 |
| 4th | | | X | | (X) | X | 1.45 | 1.56 |
| 5th | | | X | X | X | | 1.00 | 1.45 |
| 6th | X | | X | | X | | 0.83 | 1.21 |
| 7th | X | | X | X | | | 0.75 | 1.10 |
| 8th | X | X | X | | | | 0.64 | 1.17 |
| 9th | | X | X | X | | | 0.52 | 1.24 |

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A transmission comprising:
an input shaft, an output shaft, and second, third, and fourth shafts;
a first gearing arrangement configured to selectively constrain the second shaft to rotate at a speed between speeds of the input shaft and of the fourth shaft;
a second gearing arrangement configured to fixedly constrain the third shaft to rotate at a speed between speeds of the second shaft and of the fourth shaft;
a third gearing arrangement configured to selectively constrain the output shaft to rotate at a speed between zero and a speed of the third shaft, and to selectively constrain the input shaft to rotate at a speed between speeds of the third shaft and of the output shaft;
a first clutch configured to selectively couple the input shaft to the second shaft;
a first brake configured to selectively hold the second shaft against rotation; and
a second brake configured to selectively hold the fourth shaft against rotation.

2. The transmission of claim 1 wherein the first gearing arrangement comprises:
a first simple planetary gear set having a first sun gear fixedly coupled to the fourth shaft, a first ring gear, a first planet carrier fixedly coupled to the second shaft, and at least one planet gear supported for rotation on the first planet carrier and in continuous meshing engagement with the first sun gear and the first ring gear; and
a second clutch configured to selectively couple the input shaft to the ring gear.

3. The transmission of claim 2 wherein the second gearing arrangement comprises a second simple planetary gear set having a second sun gear fixedly coupled to the fourth shaft, a second ring gear fixedly coupled to the second shaft, a second planet carrier fixedly coupled to the third shaft, and at least one planet gear supported for rotation on the second planet carrier and in continuous meshing engagement with the second sun gear and the second ring gear.

4. The transmission of claim 3 wherein the third gearing arrangement comprises:
a third simple planetary gear set having a third sun gear fixedly coupled to the third shaft, a third ring gear, a third planet carrier fixedly coupled to the output shaft, and at least one planet gear supported for rotation on the third planet carrier and in continuous meshing engagement with the third sun gear and the third ring gear;
a fourth simple planetary gear set having a fourth sun gear fixedly coupled to the third shaft, a fourth ring gear fixedly coupled to the output shaft, a fourth planet carrier, and at least one planet gear supported for rotation on the fourth planet carrier and in continuous meshing engagement with the fourth sun gear and the fourth ring gear;
a third brake configured to selectively hold the third ring gear against rotation; and
a third clutch configured to selectively couple the input shaft to the fourth planet carrier.

5. A transmission comprising:
an input shaft, an output shaft, a second shaft, and a third shaft;
a first gearing arrangement configured to selectively constrain the second shaft to rotate at a speed between speeds of the input shaft, and of the third shaft and to selectively constrain the third shaft to rotate at a speed between zero and a speed of the second shaft;
a second gearing arrangement configured to selectively constrain the output shaft to rotate at a speed between zero and a speed of the third shaft;
a third gearing arrangement configured to selectively constrain the input shaft to rotate at a speed between speeds of the third shaft and of the output shaft;
a first clutch configured to selectively couple the input shaft to the second shaft; and
a first brake configured to selectively hold the second shaft against rotation.

6. The transmission of claim 5 wherein the second gearing arrangement comprises:
a third simple planetary gear set having a third sun gear fixedly coupled to the third shaft, a third ring gear, a third planet carrier fixedly coupled to the output shaft, and at least one planet gear supported for rotation on the third planet carrier and in continuous meshing engagement with the third sun gear and the third ring gear; and
a third brake configured to selectively hold the third ring gear against rotation.

7. The transmission of claim 6 wherein the third gearing arrangement comprises:
a fourth simple planetary gear set having a fourth sun gear fixedly coupled to the third shaft, a fourth ring gear fixedly coupled to the output shaft, a fourth planet carrier, and at least one planet gear supported for rotation on the fourth planet carrier and in continuous meshing engagement with the fourth sun gear and the fourth ring gear; and
a third clutch configured to selectively couple the input shaft to the fourth planet carrier.

8. A transmission comprising:
four simple planetary gearsets wherein
a carrier of the first gearset is fixedly coupled to a ring of the second gearset,
suns of the first and second gearsets are fixedly coupled to one another,
a carrier of the second gearset is fixedly coupled to suns of the third and fourth gearsets, and
an output is fixedly coupled to a carrier of the third gearset and a ring of the fourth gearset.

9. The transmission of claim 8 further comprising:
an input selectively coupled to a ring of the first gearset, selectively coupled to the carrier of the first gearset and the ring of the second gearset, and selectively coupled to a carrier of the fourth gearset.

10. The transmission of claim 9 further comprising:
a first brake configured to selectively hold the carrier of the first gearset and the ring of the second gearset against rotation;
a second brake configured to selectively hold the suns of the first and second gearsets against rotation; and
a third brake configured to selectively hold a ring of the third gearset against rotation.

* * * * *